US007844644B2

(12) United States Patent
Shin

(10) Patent No.: US 7,844,644 B2
(45) Date of Patent: Nov. 30, 2010

(54) METHOD AND APPARATUS FOR MANAGING DATA WRITTEN IN MARKUP LANGUAGE AND COMPUTER-READABLE RECORDING MEDIUM FOR RECORDING A PROGRAM

(75) Inventor: Hyo-seop Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1291 days.

(21) Appl. No.: 10/991,616

(22) Filed: Nov. 19, 2004

(65) Prior Publication Data

US 2005/0131906 A1 Jun. 16, 2005

(30) Foreign Application Priority Data

Dec. 13, 2003 (KR) ...................... 10-2003-0090937

(51) Int. Cl.
*G06F 17/30* (2006.01)

(52) U.S. Cl. ...................................... 707/821; 707/822

(58) Field of Classification Search ...................... 707/3
See application file for complete search history.

(56) References Cited

U.S. PATENT DOCUMENTS

| | | | | |
|---|---|---|---|---|
| 4,558,413 | A * | 12/1985 | Schmidt et al. | 707/203 |
| 5,765,177 | A | 6/1998 | Nakatsuyama et al. | |
| 6,105,033 | A * | 8/2000 | Levine | 707/101 |
| 6,128,627 | A * | 10/2000 | Mattis et al. | 707/202 |
| 6,289,358 | B1 * | 9/2001 | Mattis et al. | 707/203 |
| 2002/0016801 | A1 | 2/2002 | Reiley et al. | |
| 2002/0029229 | A1 * | 3/2002 | Jakopac et al. | 707/500 |
| 2002/0049705 | A1 | 4/2002 | Haviv-Segal et al. | |
| 2002/0049782 | A1 | 4/2002 | Herzenberg et al. | |
| 2002/0169688 | A1 * | 11/2002 | Kasai | 705/26 |
| 2004/0205044 | A1 * | 10/2004 | Su et al. | 707/2 |

FOREIGN PATENT DOCUMENTS

| | | | |
|---|---|---|---|
| EP | 1 146 672 | A1 | 10/2001 |
| JP | 2003-92753 | A | 3/2003 |
| JP | 200367402 | A | 7/2003 |
| KR | 2001-0045025 | A | 6/2001 |
| KR | 2002-0047861 | A | 6/2002 |
| WO | WO 01/90873 | A1 | 11/2001 |

OTHER PUBLICATIONS

Relational Datebases for Querying XML Documents: Limitations and Opportunities., Jayavel Shanmugasundaram, et al., 1999.

(Continued)

*Primary Examiner*—Wilson Lee
*Assistant Examiner*—Kim T Nguyen
(74) *Attorney, Agent, or Firm*—Sughrue Mion, PLLC

(57) ABSTRACT

A method and apparatus for managing data written in a markup language so as to allow efficient storage, deletion, updating and retrieval of the digital data and a recording medium for storing a program designed to perform the same method. To allow efficient storage, deletion, updating and retrieval of digital data, data written in a markup language is split into fragments and each fragment is managed in a predetermined relational table. An index for the digital data based on the fragment allows the fragmented digital data to be efficiently accessible.

21 Claims, 13 Drawing Sheets

OTHER PUBLICATIONS

On Supporting Containment Queries in Relational Database Management Systems: Chun Zhang, et al., May 21-24, 2001.
Indexing and Querying XML Data for Regular Path Expressions: Quanzhon Li, et al., pp. 361-370, 2001.
Acceleration XPath Location Steps: Torsten Grust, Jun. 4-6, 2002.
Zheng Qingwen, et al., "A Study on the Role of Metadata in Web Information Resource Organization", Library and Information Service, Nov. 10, 2003, pp. 78-83.
Toshikazu Ohwada, "Decomposing Index Information for Digital Broadcasting," Jul. 9, 1998, pp. 17-24, vol. 98, No. 58.

* cited by examiner

FIG. 1(PRIOR ART)

```
<TVAMain>

 <ProgramInformationTable>
 <ProgramInformation programId="PROG-123">
     <BasicDescription>
         <Title>Sunrise News</Title>
         <Synopsis>Morning News</Synopsis>
         <Keywords>
             <Keyword>politics</Keyword>
             <Keyword>economy</Keyword>
         </Keywords>
         <Genre>News</Genre>
         <CreditsList>
             <CreditsItem>
                 <Role>Reporter</Role>
                 <Agent>Richard Perry</Agent>
             </CreditsItem>
             <CreditsItem>
                 <Role>Producer</Role>
                 <Agent>Tom Martin</Agent>
             </CreditsItem>
         </CreditsList>
     </BasicDescription>
 </ProgramInformation>
 </ProgramInformationTable>

 <ProgramLocationTable>
 <BroadcastEvent serviceIdRef="NBC">
     <ProgramIdRef>PROG-123</ProgramIdRef>
     <PublishedTime>2003-04-29T09:40:00</PublishedTime>
     <PublishedDuration>PT30M0S</PublishedDuration>
 </BroadcastEvent>
 </ProgramLocationTable>

 <ServiceInformationTable>
 </ServiceInformation serviceId="NBC">
   <Name>NBC</Name>
   <ServiceURL>www.nbc.com</ServiceURL>
 </ServiceInformation>
 </ServiceInformationTable>

 </TVAMain>
```

| Today | 9:00p | 9:30p | 10:00p |
|---|---|---|---|
| 507 HBOF | ◁ Out of Arfica-Movie-Spanish [HD] ▷ | | |
| 508 HBFW | ◁ Into the West-Movie | | Hocus Pocus ▷ |
| 512 MAX | ◁ Vertical Limit-Movie [HD] | | American Be.... ▷ |
| 513 MMAX | The Gauntlet-Movie | | |
| 514 MaxW | ◁ The Bridges of Madison County-Movie [LB] | | |

METHOD AND APPARATUS FOR MANAGING DATA WRITTEN IN MARKUP LANGUAGE AND COMPUTER-READABLE RECORDING MEDIUM FOR RECORDING A PROGRAM

CROSS-REFERENCE TO RELATED APPLICATION

This application claims the priority of Korean Patent Application No. 10-2003-0090937, filed on Dec. 13, 2003, in the Korean Intellectual Property Office, the disclosure of which is incorporated herein in its entirety by reference.

BACKGROUND OF THE INVENTION

1. Field of the Invention

The present invention relates to a method and apparatus for managing data written in a markup language, and a computer-readable recording medium for recording a program designed to perform the same method, and more particularly, to a method for generating, storing, deleting, and updating a fragment obtained by splitting data written in a markup language and generating, storing, deleting, and updating an index associated with the fragment, and a computer-readable recording medium for recording a program designed to perform the same method.

2. Description of the Related Art

Digital devices containing digital circuits for processing digital data are growing in popularity. Examples of digital devices include computers, printers, scanners, pagers, digital cameras, facsimiles, digital copiers, personal digital assistants (PDAs), cellular phones, digital home appliances, digital phones, digital projectors, home servers, digital video recorders, digital TV broadcast receivers, digital satellite broadcast receivers, and set-top boxes.

Meanwhile, digital data processed by digital devices can be represented in various programming languages. In particular, markup languages including Standard Generalized Markup Language (SGML), HyperText Markup Language (HTML), and Extensible Markup Language (XML) are gaining popularity due to their increased ability to convey structural information. Detailed information on markup languages can be found at http://www.w3.org or http://www.xml.com. The most commonly used markup language is XML, which is an official World Wide Web Consortium (W3C) standard, and various other markup languages are expected to be developed in the future.

As shown in FIG. 1, digital data formatted with a markup language is divided into structure and content. For example, as shown in FIG. 2, the digital data may have a hierarchical structure consisting of a root node "TVAMain" 10 and children nodes "ProgramDescripton," "ProgramLocatonTable," "BroadcastEvent" 11, "EventDescription," "ServiceId" 12, "PublishedTime" 13, and "PublishedDuration" 14. FIG. 2 shows part of a hierarchical structure of digital data used as metadata for a broadcast program in the TV-Anytime Forum, a private organization founded in September 1999 to develop specifications to enable audio-visual and other services in a user environment such as a personal digital recorder (PDR) having high capacity storage for personal use.

Digital devices can gain quicker access to desired content using information on the hierarchical structure when processing digital data written in a markup language and formatted according to a predetermined protocol.

Thus, digital data written in a markup language and having a format predefined according to a predetermined protocol can be effectively processed in various digital devices such as computers, PDAs, and cellular phones conforming to this protocol.

Due to these advantages, digital data written in a markup language are commonly used in enterprise-class systems with excellent computing capability as well as small digital devices with restricted computing capability.

Digital data written in a markup language has a wide range of uses ranging from personal information such as a telephone number list to metadata for describing and managing multimedia data. There are a variety of different types of digital data having different content and structures for each different kind of use.

Various approaches have been proposed for managing digital data written in a markup language. For example, one representative method for storing and retrieving XML data is a node numbering scheme as shown in FIG. 3. The node numbering scheme has been presented in [1] Chun Zhang, Jeffrey F. Naughton, Qiong Luo, David J. DeWitt, and Guy M. Lohman "On Supporting Containment Queries in Relational Database Management Systems," In Proc. of the 2001 ACM-SIGMOD conference, Santa Barbara, Calif., USA, May 2001, [2] Quanzhong Li and Bongki Moon "Indexing and Querying XML Data for Regular Path Expressions," In Proc. of the 26th VLDB conference, Rome, Italy, September 2001, and [3] Torsten Grust "Accelerating XPath Location Steps," In Proceedings of the 2002 ACM-SIGMOD conference, pages 109-120, Madison, Wis., June 2002.

The node numbering scheme allows each node (element or attribute) in an XML document to be naturally mapped to a tuple in a relational table. Each tuple is expressed in a structure <doc_id, begin_pos, end_pos, level>.

Here, doc_id is an ID of a document, begin_pos and end_pos denote information on the position of a node within the document, and level denotes the depth of the node from a root node. For example, a tuple corresponding to each node present within a ProgramInformation node in the XML document of FIG. 1 may be represented by each node of a tree shown in FIG. 3 using a node numbering scheme.

In FIG. 3, since all nodes belong to the same document, doc_id is set to 1, and a terminal node is used as a special node type designating a text value of a parent node.

In the node numbering scheme, ancestor-descendant and parent-child relationships between two nodes are expressed using the operators '//' and '/' in the XPath language and the XQuery language, respectively, and the relationships are determined by comparing a field value of each tuple. For example, if node 'A' is an ancestor of node 'b' (i.e. A//B), the nodes 'A' and 'B' satisfy requirements: 'A.doc_id==B.doc_id, A.begin_pos<B.begin_pos, and A.end_pos>B.end_pos'. If node A' is a parent of node B' (i.e., A/B), 'A.level==B.level-1' is added to the above requirements.

A structural join can be performed using the above-mentioned requirements to find a pair of nodes that satisfy a query expressed as 'A/B' or 'A//B' in an XPath or XQuery language.

The node numbering scheme enables the storage and retrieval of general XML data without the need for information on a document type definition (DTD) or XML schema associated with input data. However, this scheme suffers from several drawbacks in small digital devices having restricted computing capability. The number of joins that must be performed to process a path expression to retrieve XML data is equal to the length of the path expression.

Since an insufficient memory is available for computation in small digital devices, Input/Output operation is frequently generated, which may result in significant performance degradation. In restoring the XML data, the same result occurs. Updating a child node may result in updating a parent node, thus making the update process ineffective.

Another method for storing and retrieving documents is an attribute inlining technique. This technique not only prevents excessive fragmentation caused by node numbering by inlining one or more XML nodes into a single table but also allows a relational database to be automatically implemented using a given DTD or XML schema.

For more information on attribute inlining, see [Javavel Shanmugasundaram, Kristin Tufte, Chun Zhang, Gang He, David J. Dewitt, and Jeffrey F. Naughton "Relational Databases for Querying XML Documents: Limitations and Opportunities," In Proc. of the 25th VLDB conference, pages 302-314, Edinburgh, Scotland, September 1999].

However, like the node numbering scheme, attribute inlining requires a large amount of computation when each of many nodes within a DTD has a plurality of cardinalities. Furthermore, since the method is very sensitive to schema (DTD) for XML data, changes in node attributes cause recreation of a database.

Therefore, there is a need for a method for effectively managing digital data written in a markup language.

SUMMARY OF THE INVENTION

It is an object of the present invention to provide a method and apparatus for effectively managing data written in a markup language and a computer-readable recording medium for recording a program designed to perform the same method.

It is another object of the present invention to provide a method and apparatus for effectively creating an index for data written in a markup language and a recording medium for storing a program designed to perform the indexing method.

In one aspect of the present invention, the present invention provides an apparatus for managing data written in a markup language, comprising a data provider that provides fragments having the data written in the markup language split by a predetermined group of nodes, a storage unit that stores the fragments and identifiers used for distinguishing the fragments on a fragment-by-fragment basis, and a data processor that, upon request for data, retrieves a fragment containing the requested data from the storage unit and provides the same.

The apparatus may further comprise a fragment managing unit that analyzes the fragment provided by the data provider and stores the fragment and the identifier used for distinguishing the fragment in the storage unit on a fragment-by-fragment basis.

When the analyzed fragment is more recent than the data previously stored in the storage unit, the fragment managing unit may update a fragment containing the previously stored data.

Meanwhile, the apparatus may also further comprise an index managing unit that analyzes the fragment provided by the data provider, generates an index corresponding to the data and stores the generated index in the storage unit on an index-by-index basis.

The data provider may further provide an index for the fragment.

Also, the apparatus may further comprise an index managing unit that analyzes the index provided by the data provider and stores the index and an identifier used for distinguishing the index in the storage unit on an index-by-index basis.

When the analyzed index is more recent than the index previously stored in the storage unit, the index managing unit may update the corresponding index.

Also, the data provider may selectively provide fragmented data among received digital broadcast streams.

The apparatus may further comprise a metadata browser that parses the fragment provided by the data processor and outputs the same.

In another aspect of the present invention, the present invention provides a method for managing data written in a markup language, comprising providing fragments having the data written in the markup language split by a predetermined group of nodes, analyzing the fragments and storing the fragments and identifiers used for distinguishing the fragments on a fragment-by-fragment basis, and upon request for data, retrieving a fragment containing the requested data from the storage unit and providing the same.

The method may further comprise, when the analyzed fragment is more recent than the previously stored one, updating the corresponding previously stored fragment.

Also, the method may further comprise analyzing the provided fragment, generating an index corresponding to the data and storing the generated index.

The method may further comprise providing an index for the fragment.

The method may further comprise analyzing the provided index and storing the index and an identifier used for distinguishing the index on an index-by-index basis.

When the analyzed index is more recent than the previously stored index, the method may further comprise updating the corresponding previously stored index.

The method may also further comprise selectively providing fragmented data among received digital broadcast streams.

The method may further comprise parsing the provided fragment and outputting the same.

A computer-readable recording medium for recording a program for executing the method is constructed to perform the methods described above.

BRIEF DESCRIPTION OF THE DRAWINGS

The above and other features and advantages of the present invention will become more apparent by describing in detail exemplary embodiments thereof with reference to the attached drawings in which:

FIG. 1 is an exemplary diagram of typical data written in a markup language;

DETAILED DESCRIPTION OF THE INVENTION

Figure 2:
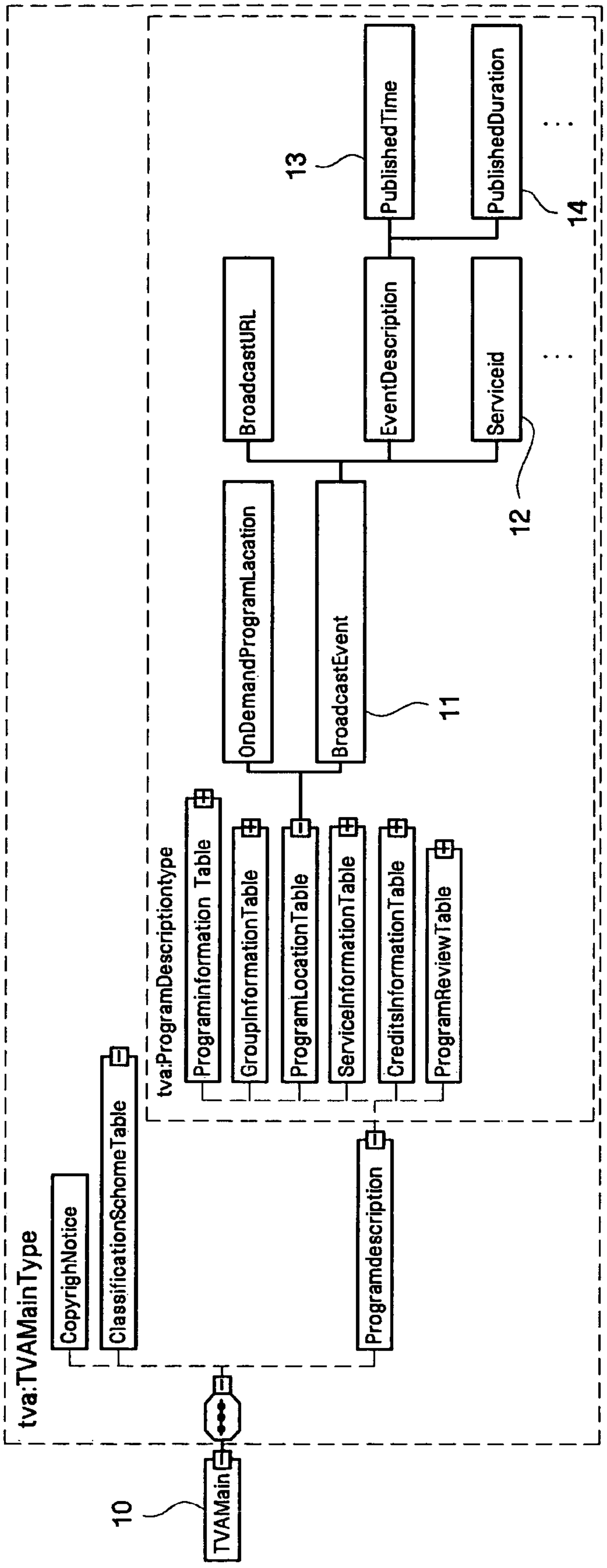
FIG. 2 illustrates a general structure of data written in a markup language.
Figure 3:
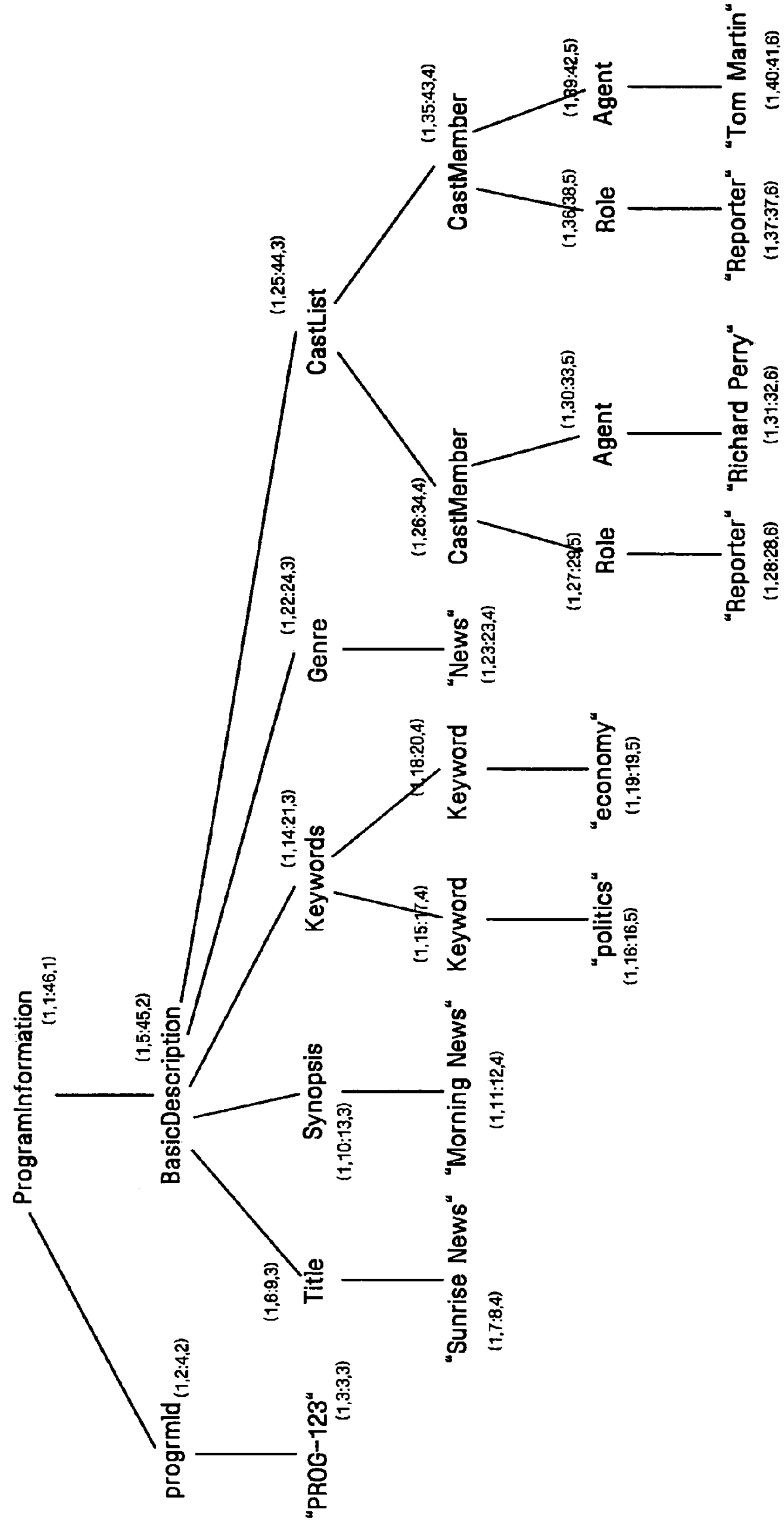
FIG. 3 illustrates a method for storing data written in a markup language using a conventional node numbering scheme.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

A method and apparatus for effectively managing data written in a markup language according to illustrative embodiments of the present invention will now be described in detail with reference to the accompanying drawings.

Before illustrating an exemplary implementation of the present invention, the concept of fragmentation will first be described. Fragmentation refers to splitting digital data written in a markup language into smaller fragments. The present invention basically manages the digital data in fragments. A fragment policy for digital data written in a markup language may be determined by a digital device for processing the digital data or a protocol for sending and receiving predetermined digital data among multiple digital devices (hereinafter referred to as a 'domain').

The concept of fragments will now be described briefly with reference to FIG. 4. The digital data formatted with a markup language shown in FIGS. 1 and 2 is broken down into tree structures, each of which is called a fragment.

Figure 4:
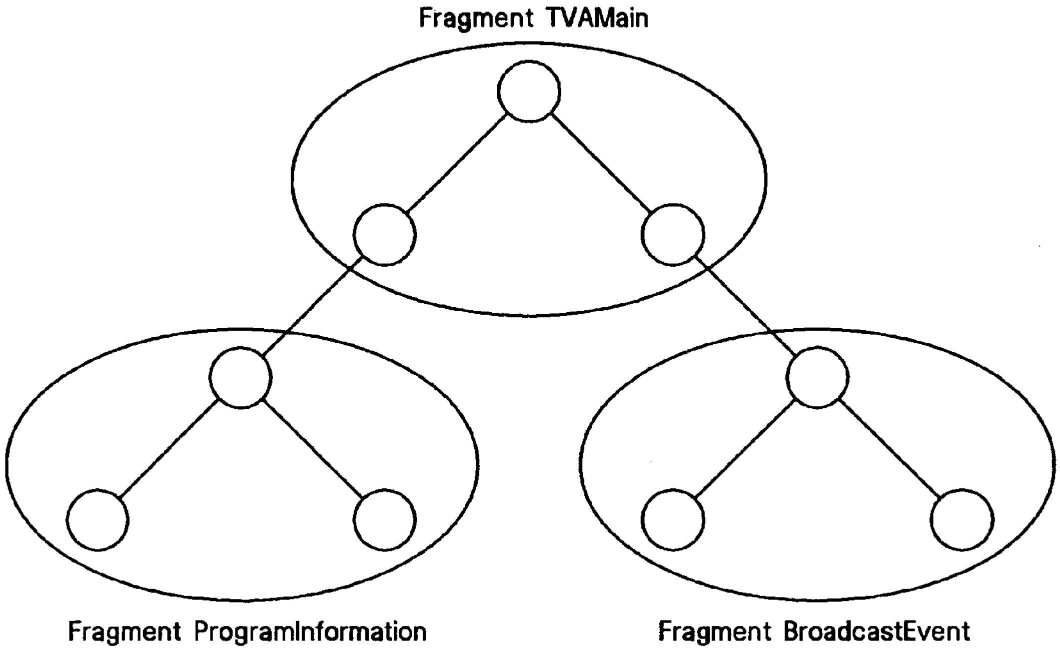
FIG. 4 is a conceptual diagram for explaining fragmentation of data written in a markup language.

For example, if the digital data is segmented into a tree structure with a parent node TVAMain and predetermined children nodes (fragment TVAMain), a tree structure with a parent node ProgramInformation Table and children nodes below the parent node (fragment ProgramInformation), and a tree structure with a parent node BroadcastEvent and children nodes below the parent node (fragment BroadcastEvent), each segmented tree structure serves as a fragment.

and BroadcastEvent in FIG. 4, the way to split and the number of fragments is arbitrarily determined by the fragment policy of the particular domain.

Meanwhile, since each fragment can be updated independently, a parent-child relationship between two nodes belonging to different fragments may no longer exist. Thus, to maintain the parent-child relationship between two nodes upon fragmentation of digital data written in markup language, a fragment policy is designed such that the two nodes belong to the same fragment type, or an IDREF node type is used to allow a node to refer to another node.

Fragmentation of digital data is more useful for access to digital data written in a markup language, and in particular, to a predetermined node contained in the digital data.

To achieve this, first, the fragment policy is used to find a fragment containing a desired node and then access is made directly to the appropriate node. Thus, it is possible to obtain desired information by processing only the pertinent fragment instead of the whole digital data Meanwhile, in the case of Extensible Markup Language (XML), a World Wide Web Consortium (W3C)-defined XML Path Language (XPath) may be used to mark a predetermined node contained in fragmented digital data. Here, XPath is a syntax for describing a path to a node within an XML document. Specifically, XPath is used to indicate a pertinent node contained in a fragment by specifying a) an absolute path from the root node of digital data to a parent node of the fragment containing the pertinent node and b) a relative path from the parent node of the pertinent fragment to the pertinent node.

To identify fragmented digital data, an indicating method using an absolute or relative path may be used. For example, an absolute path of a parent node in each fragment may be used to identify each fragment. In addition to specifying an absolute path using XPath, when an absolute path has a fixed pattern, the absolute path can be represented in code according to a predetermined mapping rule. For example, while fragment BroadcastEvent shown in FIGS. 2 and 4 may be represented as '/TVAMain/ProgramDescription/ProgramLocationTable/BroadcastEvent' using XPath, the same fragment is expressed by 'FF01' according to a mapping rule. In this case, fragment type BroadcastEvent can be identified by 'FF01'.

A data management structure according to a preferred embodiment of the present invention will now be described.

In this embodiment, fragmented digital data are managed in a relational table as shown in Table 1 below:

TABLE 1

| | | | |
|---|---|---|---|
| Fragment#1_id | fragment#1_type | fragment#1_version | fragment#1_content |
| Fragment#2_id | fragment#2_type | fragment#2_version | fragment#2_content |
| Fragment#3_id | fragment#3_type | fragment#3_version | fragment#3_content |
| . . . | . . . | . . . | . . . |

Fragmentation is a useful technique for managing or transmitting high volume digital data. For example, if digital data is segmented into several fragments that are organized to be distinguishable from one another, it is possible to independently access or transmit only desired fragments.

The hierarchical structure of digital data written in a markup language in a domain is divided into a set of fragments or fragment types. A fragment type may be the child of another fragment type. Although digital data are split into the above three fragment types TVAMain, ProgramInformation, Table 1 contains fragment_id, fragment_type, frag ment_version, and fragment_content for each fragment.

Here, fragment_id denotes an identifier of each fragment used for distinguishing a fragment in a transmission network or database, fragment_type denotes the type of the pertinent fragment, fragment_version denotes the version of the fragment, and fragment_content denotes a repository where fragmented digital data is stored. In this case, the digital data can be stored in fragments in text or parsed form.

Managing the fragmented data using the relational table allows a digital device to effectively access the desired information without the need to process all digital data. Specifically, the first step to gain access to the desired information is to identify a fragment type containing the desired information using the fragment policy described earlier.

When multiple fragments are found to be of the same fragment type, fragment version is checked to select the latest version of fragment. The fragment content of the selected fragment is then checked to obtain the desired information. If the fragment content is in the form of unparsed text, the desired information can be extracted by performing parsing on the content.

An index structure for digital data according to a preferred embodiment of the present invention will now be described.

To retrieve a fragment that satisfies certain conditions, it is preferable to create an index for nodes frequently referred to under search terms and then refer to the index instead of examining the content of all fragments.

An index whose key value is a node value can be created for a fragment type. For example, if an index whose key value is a 'Genre' node value is created for fragment type ProgramInformation in the XML document of FIG. 1, it is possible to retrieve information on programs belonging to a particular genre.

Thus, it is desirable to provide the index structure for digital data to allow effective retrieval of and access to digital data.

A node in digital data written in a markup language may be used as a key for indexing. For example, in FIG. 2, 'PublishedTime' may be used as a key for indexing.

To specify a key, as described above, an absolute path of a fragment containing a node corresponding to the key and a relative path within the fragment may be used.

Referring to FIGS. 2 and 4, if 'Published Time' is used as a key, information about the key may be specified as a) an absolute path '/TVAMain/ProgramDescription/ProgramLocationTable/BroadcastEvent' of fragment 'BroadcastEvent' containing node 'PublishedTime' and b) a relative path 'EventDescription/PublishedTime' of node 'PublishedTime' within fragment 'BroadcastEvent'.

Conclusively, for effective management of digital data written in markup language, it is desirable to fragment the data and manage fragments in a relational table constructed as described above. Furthermore, it is more preferable to provide an index structure for effective access to fragmented digital data.

A key used in an index structure may be a node contained in a corresponding fragment, and using the index structure allows direct access to a fragment containing the desired content. Furthermore, an absolute path of a fragment containing a node corresponding to the key and a relative path within the fragment can be used as information about the key.

In addition to specifying the absolute and relative paths using XPath as the information on the key, when absolute and relative paths have fixed patterns, the absolute and relative paths can be represented in codes according to a predetermined mapping rule. For example, /TVAMain/ProgramDescription/ProgramLocationTable/BroadcastEvent' and EventDescription/PublishedTime' may also be represented by 'FF01' and 'AA01' according to a mapping rule, respectively.

Figure 5:
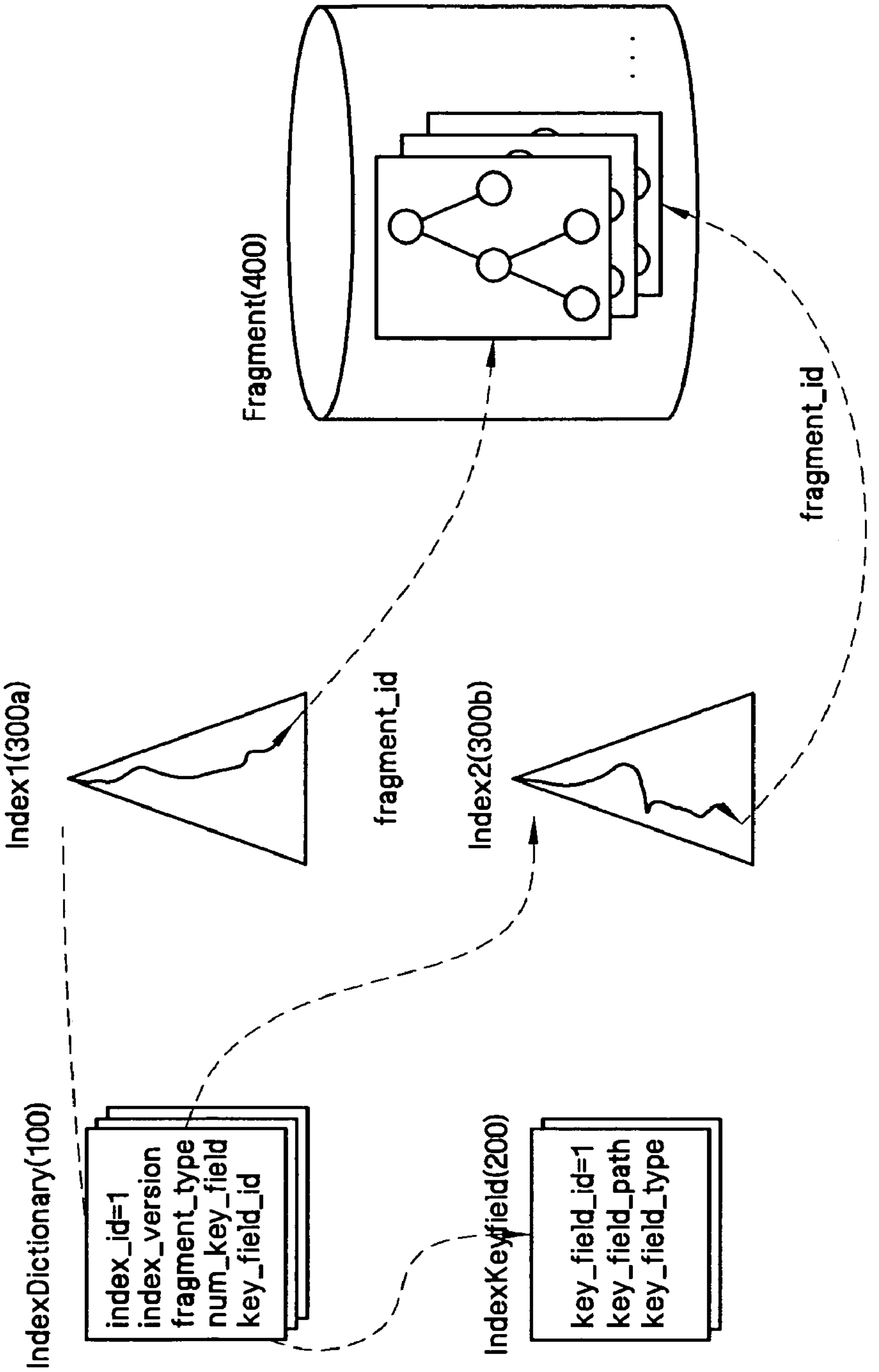
FIG. 5 illustrates the concept of managing data written in a markup language according to an embodiment of the present invention.

An index structure according to a preferred embodiment of the present invention is shown in FIG. 5.

Referring to FIG. 5, the overall structure of markup language based data consists of four components: IndexDictionary 100, IndexKeyfield 200, Index 300*a* or 300*b*, and Fragment 400.

As described above, Fragment 400, which is a relational table in which fragmented digital data are stored, contains fragment_id, fragment_type, fragment_version, and fragment_content.

To perform indexing, the index structure includes IndexDictionary 100, IndexKeyfield 200, and Index 300*a* or 300*b*.

Each of a plurality of entries forming the Index 300*a* or 300*b* consists of the fields key_value, fragment_id, fragment_type, and fragment_version. The key value may contain multiple sub-key values defined as one or more fields. The fields fragment_id and fragment_version are the same as their counterparts in Fragment 400. An index for a fragment can be created using a well-known indexing technique such as B-tree.

Since a database may contain one or more indices, two auxiliary data structures may be provided for specifying each index.

IndexDictionary 100 describes information on each index and contains index_id, index_version, fragment_type, num_key_field, and key_field_id.

Here, index_id is an ID of an index, index_version is the version of the index, num_key_field is the number of fields (nodes) contained in a key, and key_field_id is an ID of a key field. IndexKeyfield 200 specifies information on key fields in Index 300*a* or 300*b* and contains key_field_id, key_field_path, and key_field_type. The key_field_id is an ID of a key field, key_field_path is a relative path from a fragment containing a pertinent key field to the pertinent key field in a markup language data structure, and key_field_type is the type of the key field within a database. In another embodiment, an absolute path of the key field from the root node to the pertinent key field in the markup language data structure may be used as key_field_path.

A method for managing digital data written in a markup language will be described later with reference to FIG. 8.

Figure 6:
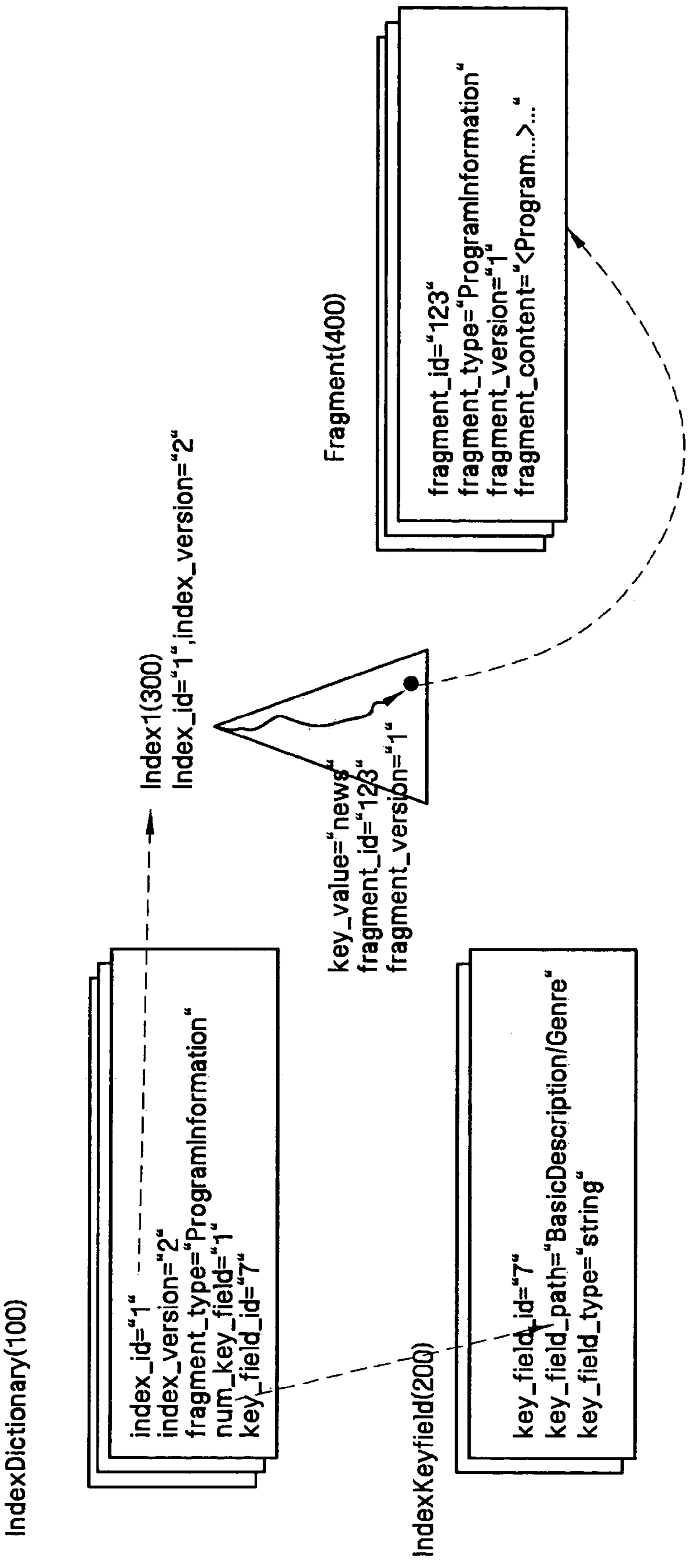
FIG. 6 illustrates the concept of managing the digital data of FIG. 1 using the concept of data management illustrated in FIG. 5.

FIG. 6 illustrates management of the digital data of FIG. 1 using the data management structure of FIG. 5 according to an embodiment of the present invention.

In the illustrative embodiment, index information on the digital data of FIG. 1 is described, where a key is Genre contained in the fragment 'ProgramInformation' and a key value is News.

IndexDictionary 100 contains information about Index 300 where index_id of an index associated with the fragment type 'ProgramInformation' is 1 and index_version is 2. IndexKeyfield 200 also contains num_key_field and key_field_id as information on a key field of Index 300. In this embodiment, num_key_field is 1, since Genre has one key field, and key_field_id is '7'.

IndexKeyfield 200 describes information on a key field for 'Genre'. For example, key_field_id is '7', key_field_path is 'BasicDescription/Genre', and key_field_type is 'string'.

An entry of Index 300 shown in FIG. 6 has a key value of 'News' for a key field of 'Genre'. The field fragment_id of a fragment containing digital data having a key value of 'News', which means the genre is news, is '123', and the field fragment_version is '1'.

Thus, a user retrieves Index 300 whose key field is 'Genre' referring to IndexDictionary 100 and IndexKeyfield 200. Then, the user retrieves an entry whose key value is 'News' from Index 300 and extracts the fields fragment_id and fragment_version of a fragment from the entry. Using the extracted information, the user retrieves a fragment containing digital data whose 'Genre' is 'News' from Fragment 400.

Figure 7:
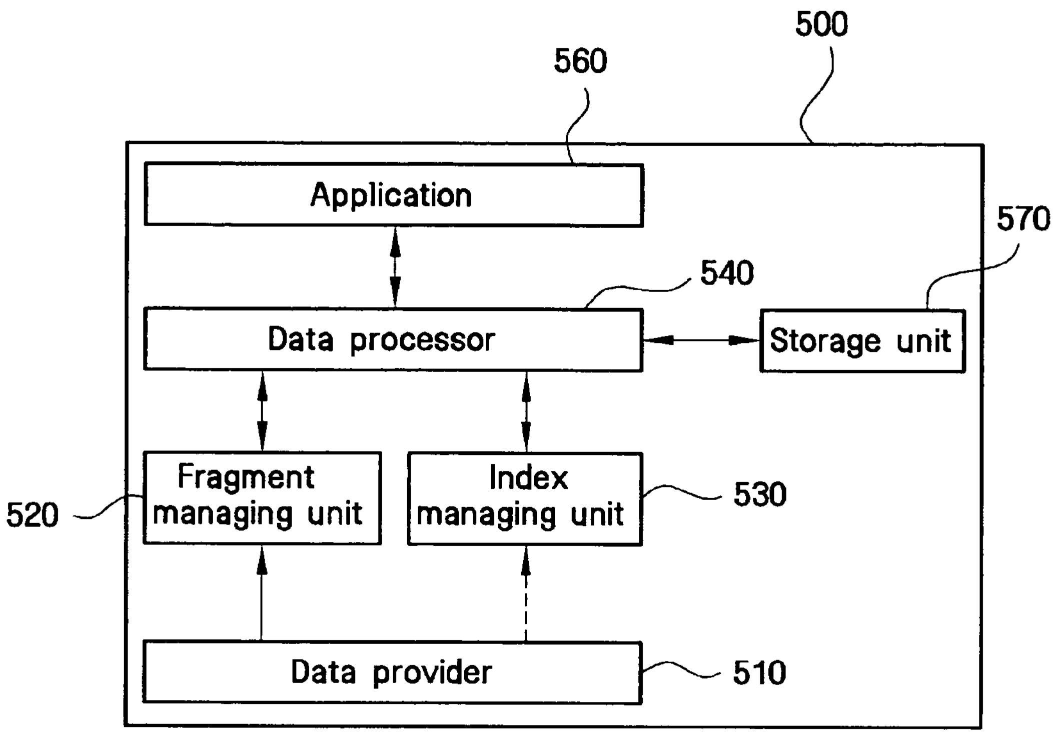
FIG. 7 is a block diagram of a digital device for managing data written in a markup language according to an embodiment of the present invention.

FIG. 7 is a block diagram of a digital device 500 for managing data written in a markup language according to an embodiment of the present invention.

Referring to FIG. 7, the digital device 500 includes a data provider 510 that provides fragmented digital data, a fragment managing unit 520 that converts the provided fragment into a data structure according to the present invention, an index managing unit 530 that creates or updates an index for the fragment, a data processor 540 that stores the provided fragment and index in a storage unit 570 and performs retrieval of the stored digital data, and an application that requests retrieval and receives needed digital data from the data processor 540 for processing.

The data provider 510 provides fragmented data according to a predetermined fragment policy by creating the fragmented data or receiving the same from another digital device.

When receiving the fragmented data from another digital device, an index for the digital data may accompany the data. The received index is then sent to the index managing unit 530 for management.

The fragment managing unit 520 analyzes the fragmented digital data provided by the data provider 510 such that pertinent fragments can be stored in an exemplary relational table as shown in Table 1.

In particular, the fragment managing unit 520 analyzes a fragment to extract information including fragment_id, fragment_type, fragment_version, and fragment_content, and delivers the extracted information to the data processor 540. When receiving an update fragment on the previously stored fragment, the fragment managing unit 520 also updates the pertinent fragment.

The index managing unit 530 analyzes the fragmented digital data provided by the data processor 540 and creates IndexDictionary 100, IndexKeyfield 200 and Index 300*a* or 300*b*.

Upon receipt of an index from the data provider 510, the index managing unit 530 can also analyze the created information. In addition, when receiving an update fragment on the previously stored fragment, the index managing unit 530 can update the index for the pertinent fragment.

The data processor 540 receives the processed results from the fragment managing unit 540 and the index managing unit 530, stores the same in the storage unit 570, retrieves a fragment requested by the application 560 from the storage unit 570, extracts digital data as needed, and delivers the digital data to the application 560. If fragment_content in the relational table stored in the storage unit 570 is a fragment itself in text form, the data processor 540 may parse the fragment in text form for delivery to the application 560.

Furthermore, upon receipt of a new fragment, the data processor 540 informs the index managing unit 530 of this fact, and, in turn, updates the pertinent index.

The data processor 540 also manages the storage unit 570. That is, the data processor 540 requests the fragment managing unit 520 and the index managing unit 530 to selectively delete the fragment and index stored in the storage unit 570 according to a request from a user or a predetermined algorithm. Meanwhile, even when receiving a request for deletion of only a fragment, it is preferable to delete an index associated with the fragment as well. Thus, when notifying the index managing unit of deletion of a fragment, the data processor 540 may request for modification of the stored index.

The operations performed by the digital device 500 of FIG. 7 are summarized as follows.

The digital device 500 may perform all of the following operations or, depending on its performance or function, selectively perform one or more operations.

1. Generating fragmented digital data
2. Storing fragmented digital data
3. Updating fragmented digital data
4. Deleting fragmented digital data
5. Generating index for fragmented digital data
6. Storing index for fragmented digital data
7. Updating index for fragmented digital data
8. Deleting index for fragmented digital data
9. Retrieving digital data
10. Output retrieved digital data Details of the functions listed above will be described below with reference to FIGS. 8A through 8C.

Figure 8A:
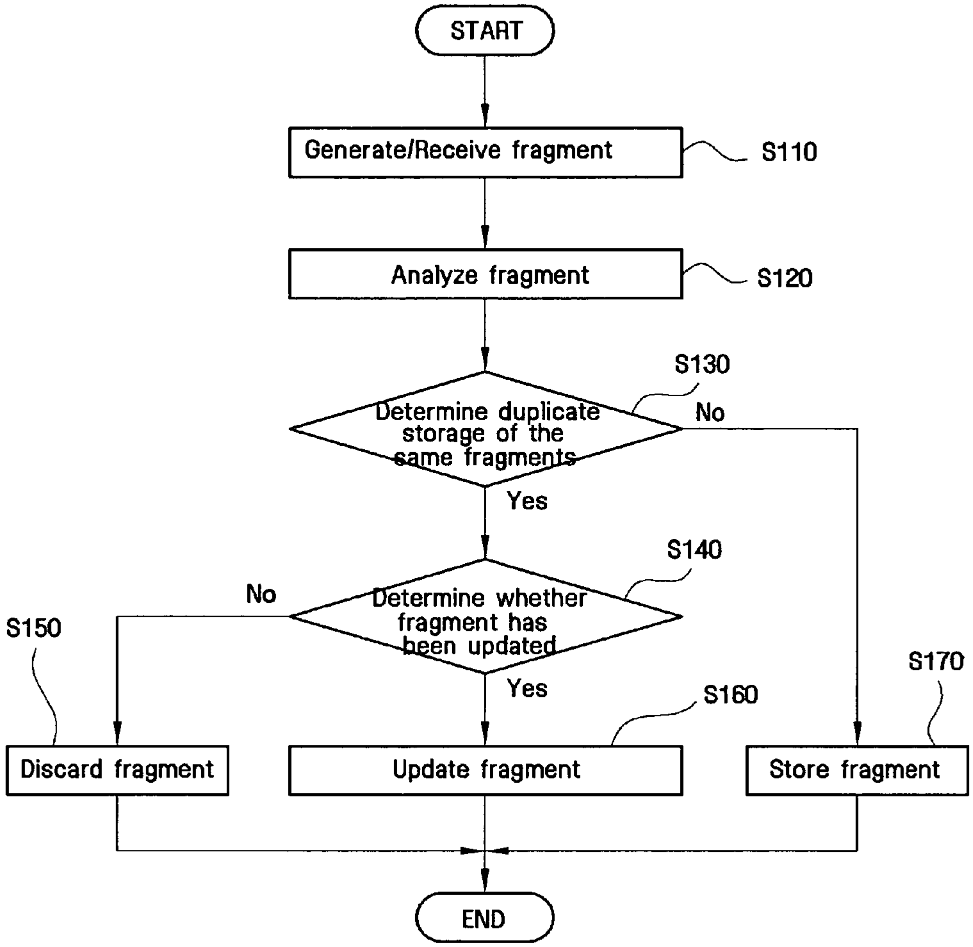
FIGS. 8A through 8C are flowcharts illustrating methods for managing and retrieving data according to embodiments of the present invention.
Figure 8B:
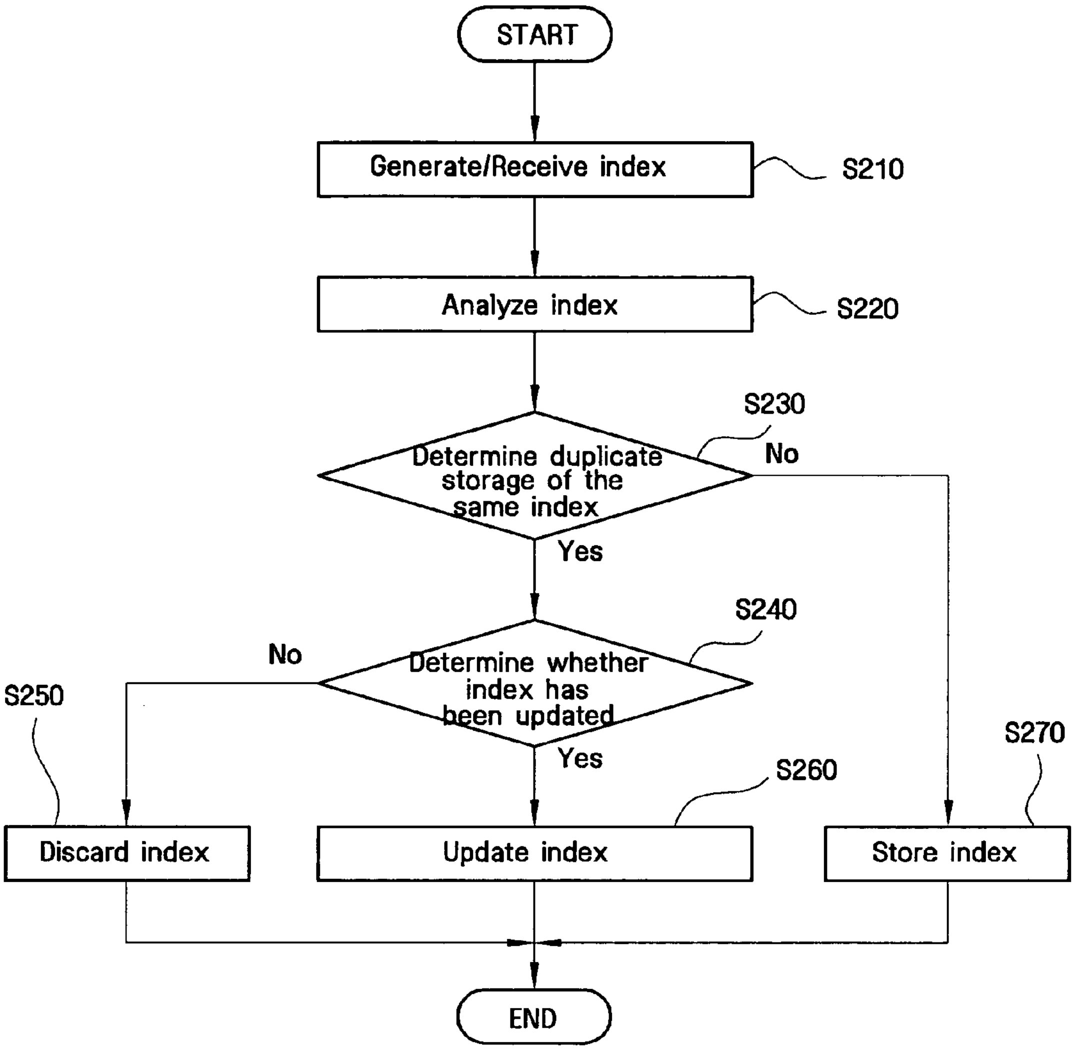
Figure 8C:
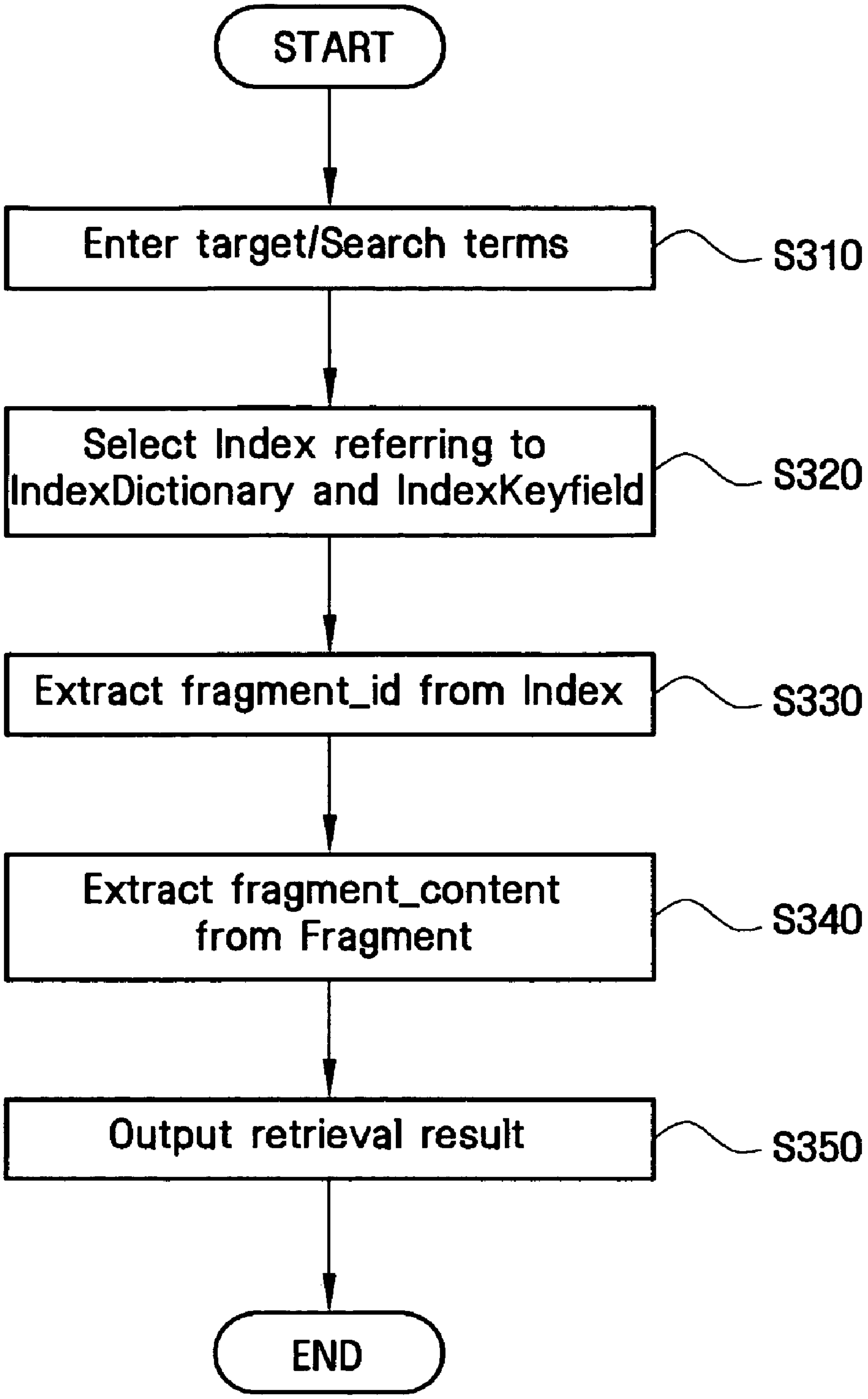

FIGS. 8A through 8C illustrate methods for managing fragmented digital data and an index according to embodiments of the present invention.

1. Generating Fragmented Digital Data

In step S110, the data provider 510 fragments the digital data according to a predetermined fragment policy. Alternatively, the data provider 510 may provide a fragment received from another digital device, or selectively provide fragmented data among received digital broadcast streams from another digital device.

2. Storing Fragmented Digital Data

In step S120, the fragment provided by the data provider 510 is analyzed by the fragment managing unit 520 in order to extract information including fragment_id, fragment_type, fragment_version, and fragment_content. The extracted information is then sent to the data processor 540 and stored in Fragment 400 of the storage unit 570.

To avoid duplicate storage of the same information, the method may further include step S130 of comparing fragment_id of the fragment provided by the data provider 510 with that of the previously stored data.

While in step S150, a fragment having the same fragment_id as the existing fragment is discarded, only a fragment having a different fragment_id is stored in step S170. In another embodiment, comparison of fragment_id may be followed by comparison of fragment_version in step S140. If the provided fragment has the same fragment_id, but a higher fragment_version than the previously stored fragment, this means that the fragment has been updated, which will be described in Paragraph 3.

Meanwhile, when a new fragment is added to the Fragment 400 of the storage unit 570 or the existing fragment is updated, an index for the new fragment also needs to be added or an index for the existing fragment needs to be updated. Processes of adding and updating an index will be described in Paragraphs 5-7.

3. Updating Fragmented Digital Data

In step S160, when a fragment having the same information as the previously stored fragment is provided from the data provider 510, the data processor 540 updates the previously stored fragment. To determine whether the two fragments are the same, various fields can be used. As described above, the fragment_version field may be used to determine whether the fragment is the same as the previously stored fragment and then whether the latter has been updated.

4. Deleting Fragmented Digital Data

The digital data stored in the storage unit 570 can be deleted in fragments. A fragment stored in a relational table may be automatically deleted upon request from a user or according to a predetermined algorithm. In this case, information on the fragment is deleted from the relational table.

5. Generating an Index for Fragmented Data

To retrieve predetermined digital data, it can be more efficient to create an index for the fragment and refer to the index than to check the content of all fragments stored in the storage unit 570. In the preferred embodiment of the present invention, a node belonging to a predetermined fragment type is set as a key and the value of the pertinent node is set as a key value. The index managing unit 530 analyzes the fragment and provides an index by creating IndexDictionary 100, IndexKeyfield 200 and Index 300*a* or 300*b* as shown in FIG. 5. Depending on the performance or function of the digital device 500, the index managing unit 530 may provide an index received from another digital device.

6. Storing an Index for Fragmented Data

The index provided by the index managing unit 530 is sent to the data processor 540 and stored in the storage unit 570. Like in the fragment management method, the index is analyzed in step S220 to determine whether the provided index is the same as the one previously stored in step S230 and then whether the latter has been updated in step S240. Depending on the result of determination, the index may be discarded or stored in step S250 or S270, or the existing index may be updated in step S260.

7. Updating an Index for Fragmented Digital Data

Upon receipt of an index having the same information as the index previously stored in the storage unit 570 from the data provider 510, the data processor 540 updates the previously stored index in step S260. To determine whether the two indices are the same, various fields can be used. For example, in step S240, the index_version field may be used to determine whether the index is the same as the previously stored index and then whether the latter has been updated. In this case, when an indexed fragment is updated, it is preferable to update an index associated with the fragment accordingly. Updates on the fragment may be sent to the index managing unit 530 from the data processor 540.

8. Deleting an Index for Fragmented Data

The index stored in the storage unit 570 can be deleted. That is, IndexDictionary 100, IndexKeyfield 200 and Index 300*a* or 300*b* may be automatically deleted upon request from the user via the application 560 or according to a predetermined algorithm.

9. Retrieving Predetermined Digital Data

In the present invention, a retrieval of digital data is performed for each fragment. A simple retrieval method may involve designating only a fragment type containing the desired digital data, retrieving the designated fragment type from the Fragment 400, and extracting the found fragment for retrieval.

Meanwhile, it is possible to use an index for more efficient retrieval. A retrieval method using the index will now be described.

In step S310, when performing retrieval of digital data, first, a target for retrieval is designated by a fragment type, and search terms are designated using a value of a specific node (key) within the pertinent fragment and a comparative operator for the specific node value.

For example, as shown in FIG. 6, to perform digital data whose 'Genre' is 'News', first, a fragment containing digital data whose 'Genre' is 'News' is retrieved using an index. For a key 'Genre' fragment type 'ProgramInformation' is designated as a target and fragments whose 'Genre' is 'News' are filtered among fragments belonging to the fragment type 'ProgramInformation'. The fragment_id's of the fragments whose 'Genre' is 'News' are checked using the index, and fragments having the fragment_id is retrieved from Fragment 400. Then, the fragment is parsed in a form as requested by an application. The retrieval process is divided into four steps:

1) Selecting index: In step S320, Index 300 that will process a user's query is selected referring to IndexDictionary 100 and IndexKeyfield 200;

2) Fragment ID filtering: In step S330, fragment_id's of fragments that match the user's query are extracted referring to Index 300;

3) Retrieving fragment content: In step 340, fragment_content having the pertinent fragment_id is extracted referring to Fragment 400;

4) Outputting retrieval result: In step S350, fragment_content is output. If fragment_content is a fragment in text form, separate parsing is performed on the fragment before output.

10. Outputting Retrieved Digital Data

That is, fragment_content is delivered to a predetermined application that in turn uses the content for data processing.

A digital broadcast receiving device for performing the digital data management method according to the present invention will now be described.

The digital broadcasting receiving device receives metadata formatted with a markup language such as XML in addition to a broadcast signal for displaying the same to a user. The metadata refers to "data about data". That is, the metadata describes information on a content file such as a program title or overview.

Figure 9:
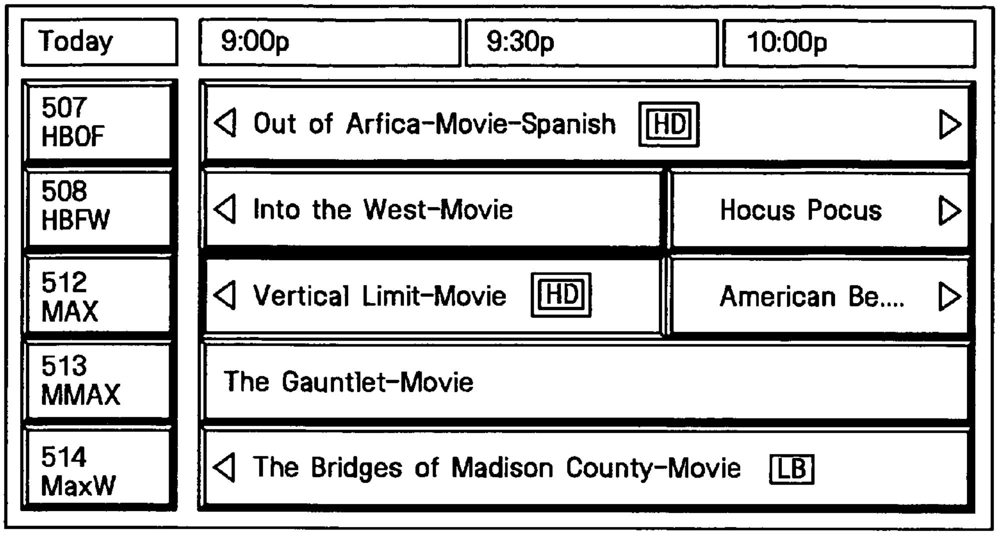
FIG. 9 shows a grid guide screen in a general electronic programming guide (EPG) application.

For example, metadata may be displayed to the user through a grid guide screen in an electronic programming guide (EPG) application shown in FIG. 9. Thus, the digital receiving device needs to efficiently manage the metadata in order to provide various search functions for a received broadcast program.

Figure 10:
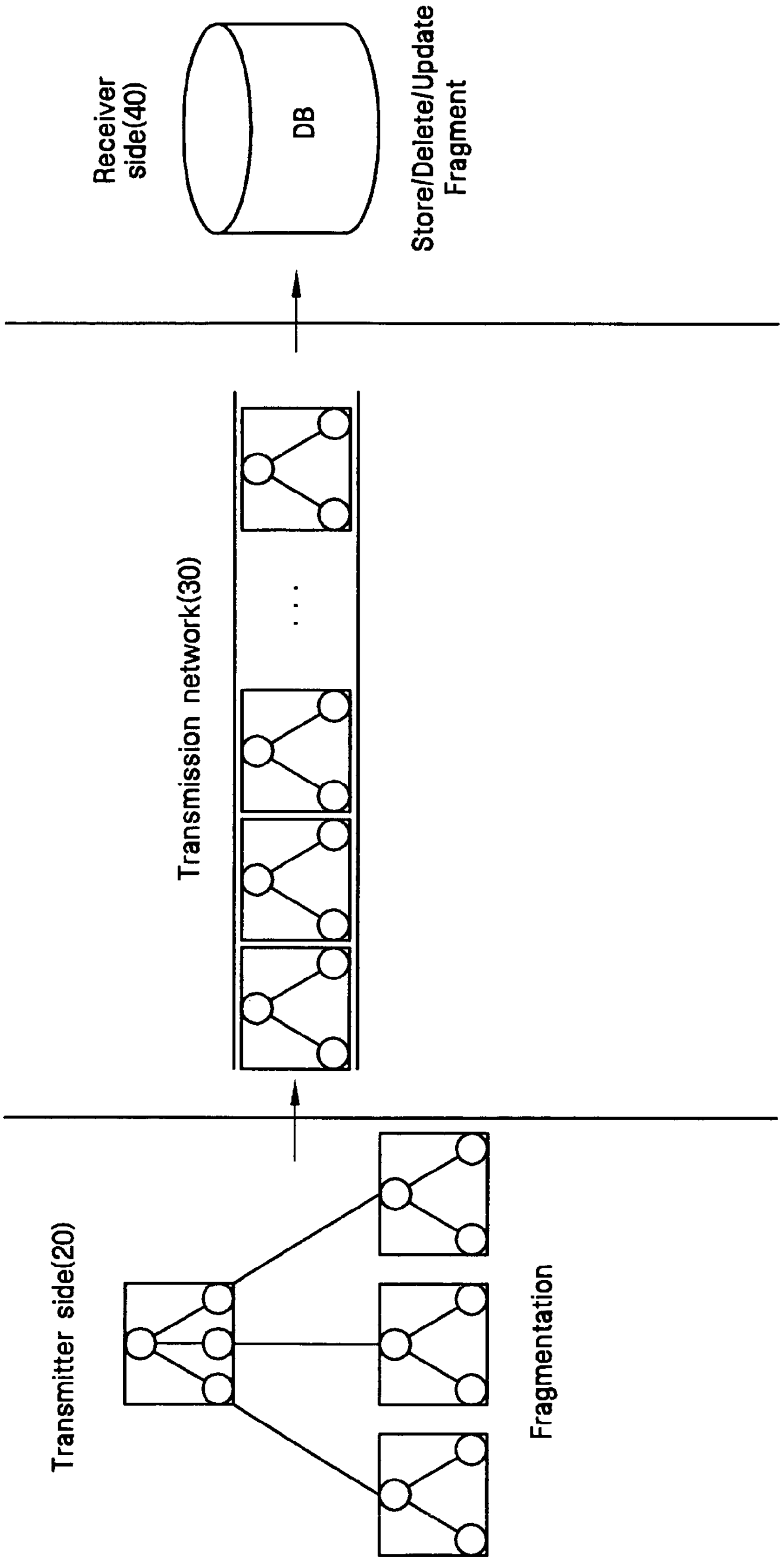
FIG. 10 is a conceptual diagram showing transmission of fragmented metadata.

As shown in FIG. 10, each of digital broadcast receiving devices of a receiver side 40 receives fragmented metadata from a transmitter side 20 through a transmission network 30. In this case, the digital broadcast receiving device may receive an index associated with fragmented metadata as well.

In particular, the present invention is usefully applied in the field of digital broadcasting.

In a digital broadcasting environment, broadcast audio and video content is transmitted via a broadcast network along with metadata that describes the content. The metadata is mainly used to retrieve or browse the broadcast content in a receiving device. XML becomes more widely adopted as a standard for metadata that describes the broadcast content. Representative examples are the TV-Anytime Metadata Specification and MPEG-7 Multimedia Description Schemes. Metadata for a broadcast program may contain various kinds of information such as programs, program groups, program reviews, credits, program schedules, and information on broadcast stations. A single metadata document consists of multiple parts including various kinds of information and contain a considerable amount of information on broadcast programs scheduled to air for a predetermined period of time (commonly, less than two weeks). Thus, it is desirable to split the metadata into smaller fragments to transmit the same over a bandwidth-limited network.

There are two advantages of splitting the entire XML document into smaller fragments for transmission. First, it is safer to divide the document into a large number of small packets for transmission over an error-prone network than to transmit a single large packet. Second, an update on a part of the document is allowed. That is, transmission of the entire document at a time requires retransmission of the entire document each time only a portion changes. In contrast, fragment-based transmission requires retransmission of only the changed portion. In a broadcasting environment, it is preferable to repeatedly transmit fragments over a carousel network so that the digital broadcast receiving device can safely receive needed broadcasting information at any time.

In FIG. 10, metadata is split into fragments, and each fragment is encapsulated together with information on identifier, version, etc., for transmission. Preferably, the receiving device that processes the fragmented digital data must meet the following requirements:

1) Efficient reconstruction of the original XML document is allowed.

2) Dynamic updating and version control for each portion of the XML document are available.

3) Efficient retrieval for each portion of the XML document is allowed.

Since the method for managing digital data written in a markup language according to the present invention can satisfy all of the requirements, it is a suitable solution for both digital broadcast sending and receiving devices.

Figure 11:
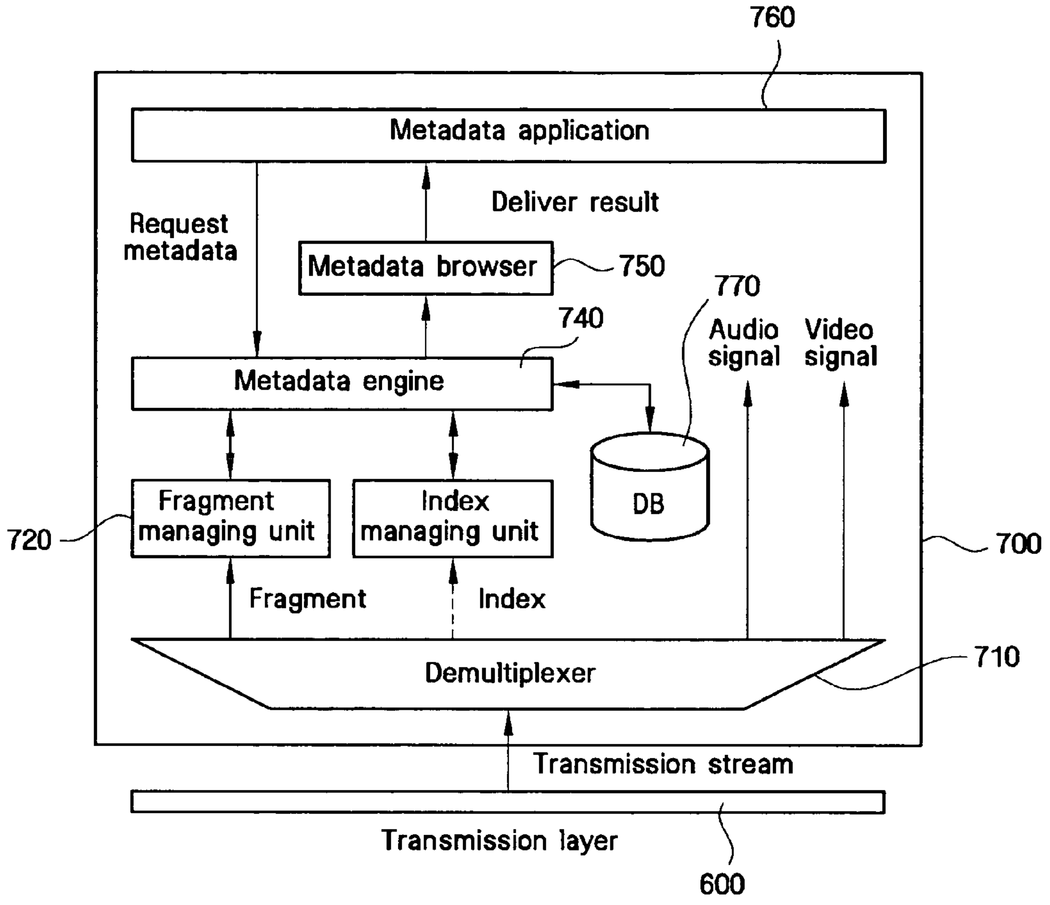
FIG. 11 is a block diagram of a digital broadcast receiving device for processing metadata written in a markup language according to another embodiment of the present invention.

FIG. 11 is a block diagram of a digital broadcast receiving device 700 according to an exemplary embodiment of the present invention.

For receipt of broadcasting service, the digital broadcast receiving device 700 further includes a demultiplexer 710 and metadata browser 750 unlike the general digital device of FIG. 7. The demuliplexer 710 receives a digital broadcast stream from a transmission layer 600, and delivers audio and video signals to appropriate processing modules and fragmented metadata and an index for the metadata related to the present invention to a fragment managing unit 720 and an index managing unit 730, respectively. The metadata browser 750 is a module responsible for only parsing among the functions of the data processor 540 shown in FIG. 7 and is indicated separately in FIG. 11.

The digital broadcast receiving device 700 according to the exemplary embodiment has basically the same configuration as the digital device of FIG. 7, except fragments are not generated within itself but received from the transmission layer 600. Since its operation is almost the same as that of the digital device of FIG. 7, a detailed explanation thereof will not be given.

While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention allows efficient storage, deletion, updating and retrieval of digital data by splitting data written in a markup language into fragments and managing each fragment in a predetermined relational table.

Furthermore, the present invention makes it easy to construct an index for the digital data based on the fragment while allowing efficient retrieval due to use of the index. Thus, this method is efficient for a lightweight digital storage device.

What is claimed is:

1. An apparatus for managing data written in a markup language, comprising:

a data provider that provides fragments having data written in the markup language split according to a predetermined group of nodes;

a storage unit that stores the fragments and identifiers used for distinguishing the fragments on a fragment-by-fragment basis;

a data processor that, upon request for data, retrieves a fragment containing requested data from the storage unit and provides the fragment; and a fragment managing unit that analyzes the fragment provided by the data provider and stores the fragment and an identifier used for distinguishing the fragment in the storage unit on the fragment-by-fragment basis, wherein when an analyzed fragment is more recent than the data previously stored in the storage unit, the fragment managing unit updates the fragment containing the previously stored data.

2. The apparatus of claim 1, further comprising an index managing unit that analyzes the fragment provided by the data provider, generates an index corresponding to the data and stores the generated index in the storage unit on an index-by-index basis.

3. The apparatus of claim 1, wherein the data provider further provides an index for at least one of the fragments.

4. The apparatus of claim 3, further comprising an index managing unit that analyzes the index provided by the data provider and stores the index and an identifier used for distinguishing the index in the storage unit on an index-by-index basis.

5. The apparatus of claim 4, wherein when the analyzed index is more recent than the index previously stored in the storage unit, the index managing unit updates the corresponding index previously stored in the storage unit.

6. The apparatus of claim 5, wherein the data provider selectively provides fragmented data among received digital broadcast streams.

7. The apparatus of claim 6, further comprising a metadata browser that parses the fragment provided by the data processor and outputs the parsed fragment.

8. A method for managing data written in a markup language, comprising:

providing fragments having the data written in the markup language split according to a predetermined group of nodes;

analyzing the fragments and storing the fragments and identifiers used for distinguishing the fragments on a fragment-by-fragment basis;

upon request for data, retrieving a fragment containing the requested data from the storage unit and providing the retrieved fragment, and when an analyzed fragment is more recent than the previously stored fragment, updating the corresponding previously stored fragment.

9. The method of claim 8, further comprising generating an index corresponding to the data and storing the generated index.

10. The method of claim 8, further comprising providing an index for at least one of the fragments.

11. The method of claim 10, further comprising analyzing the provided index and storing the index and an identifier used for distinguishing the index on an index-by-index basis.

12. The method of claim 11, further comprising, when the analyzed index is more recent than the previously stored index, updating the corresponding previously stored index.

13. The method of claim 12, further comprising selectively providing fragmented data among received digital broadcast streams.

14. The method of claim 13, further comprising parsing the retrieved fragment containing the requested data and outputting the parsed retrieved fragment.

15. A computer-readable recording medium for recording a program for executing a method for managing data written in a markup language, said method comprising:

providing fragments having the data written in the markup language split according to a predetermined group of nodes;

analyzing the fragments and storing the fragments and identifiers used for distinguishing the fragments on a fragment-by-fragment basis; and upon request for data, retrieving a fragment containing the requested data from the storage unit and providing the retrieved fragment, wherein said method further comprises, when an analyzed fragment is more recent than the previously stored fragment, updating the corresponding previously stored fragment.

16. The computer-readable recording medium of claim 15, wherein said method further comprises generating an index corresponding to the data and storing the generated index.

17. The computer-readable recording medium of claim 15, wherein said method further comprises providing an index for at least one of the fragments.

18. The computer-readable recording medium of claim 17, wherein said method further comprises analyzing the provided index and storing the index and an identifier used for distinguishing the index on an index-by-index basis.

19. The computer-readable recording medium of claim 18, wherein said method further comprises, when the analyzed index is more recent than the previously stored index, updating the corresponding previously stored index.

20. The computer-readable recording medium of claim 19, wherein said method further comprises selectively providing fragmented data among received digital broadcast streams.

21. The computer-readable recording medium of claim 20, wherein said method further comprises parsing the provided fragment containing the requested data and outputting the same.

* * * * *